Oct. 28, 1958
R. A. PALMER
2,857,838
TOASTER APPARATUS
Filed Feb. 26, 1957
2 Sheets-Sheet 1
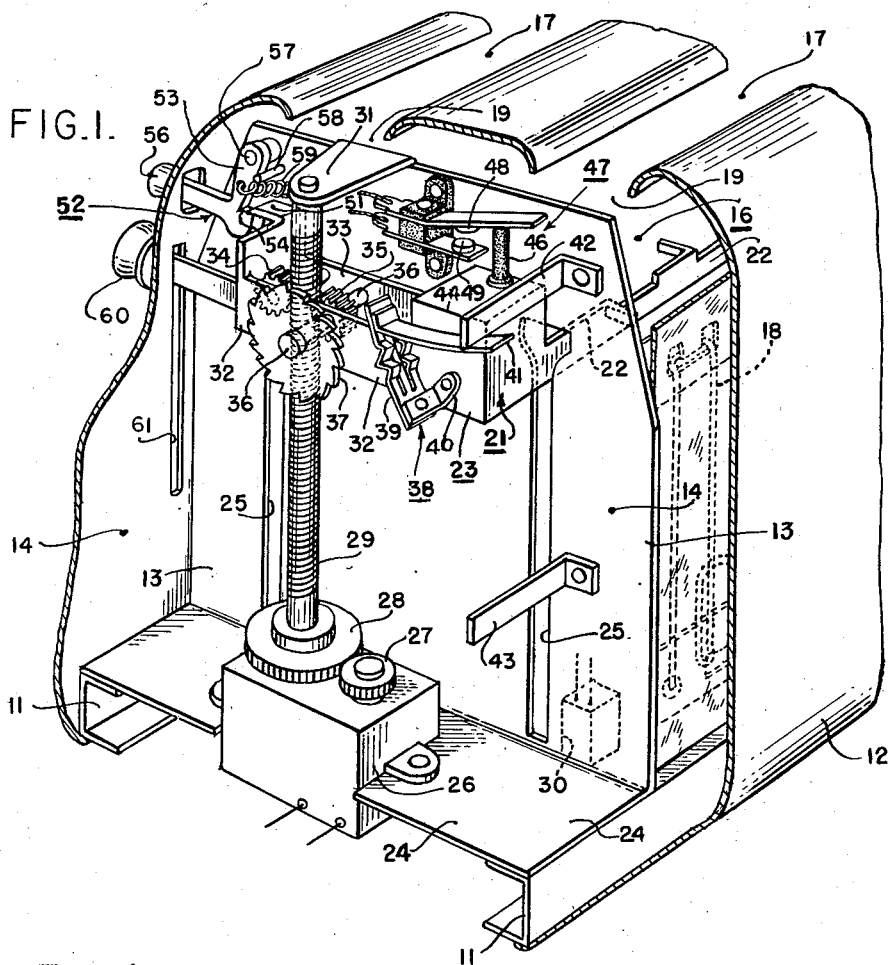
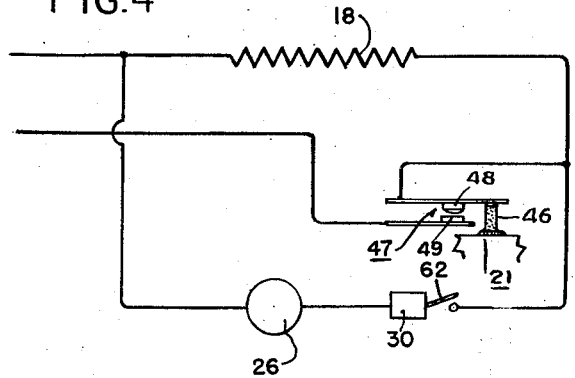
INVENTOR
REED A. PALMER
BY *Raymond J. Ridge*
ATTORNEY Oct. 28, 1958

R. A. PALMER 2,857,838

TOASTER APPARATUS

Filed Feb. 26, 1957

INVENTOR
REED A. PALMER
BY
ATTORNEY

United States Patent Office 2,857,838
Patented Oct. 28, 1958

2,857,838

TOASTER APPARATUS

Reed A. Palmer, Mansfield, Ohio, assignor to Westinghouse Electric Corporation, East Pittsburgh, Pa., a corporation of Pennsylvania Application February 26, 1957, Serial No. 642,597

7 Claims. (Cl. 99—329)

This invention relates to bread toasting apparatus, more particularly to an automatic mechanism for actuating the bread between a toasting position and a non-toasting position, and has for an object to provide improved apparatus of this kind.

The trend in bread toasting devices is toward a device which is fully automatic, that is, once the bread is inserted into the device, the bread will be moved to a toasting position, toasted and subsequently raised to a non-toasting position.

An object of the present invention is to provide improved motor driven means, of the type which may be utilized in a full automatic toaster, for raising the bread from a toasting position to a non-toasting position and for supporting the bread in the non-toasting position.

A further object is to construct a motor driven means, of the type set forth, of simple construction, economic to manufacture and easy to assemble.

In one embodiment of the present invention, a bread carriage is elevated from a lower or toasting position to an upper or non-toasting position by a worm which meshes with a pinion journalled to the carriage. The worm and pinion are placed in driving relationship by a clutch that is engaged for restraining rotation of the pinion, upon attainment of the lower position of the carriage. Responsive to a predetermined condition obtaining at the end of the toasting operation, a motor rotates the worm and, since rotation of the pinion is prevented by the clutch, the motion of the worm is transmitted to the carriage through the pinion, the latter riding upwardly upon the worm for elevating the carriage to its upper or non-toasting position.

When the carriage reaches the upper, non-toasting position, it is retained therein by a latch, and the clutch is disengaged to permit free rotation of the pinion. Upon release of the latch, the carriage gravitates from the non-toasting to the toasting position, the pinion freely rolling upon the worm during this movement. When the carriage reaches the lower, toasting position, the clutch is re-engaged, preventing further downward movement of the carriage so that, the latter is maintained in the toasting position until the worm is again rotated by the motor, as described.

These and other objects are effected by the invention as will be apparent from the following description taken in connection with the accompanying drawings, forming a part of this application, in which:

Fig. 1 is a perspective illustrating a toaster constructed in accordance with the present invention in its upper or non-toasting position;

Fig. 4 is a diagrammatic illustration of the electrical circuit; and

Figure 3:
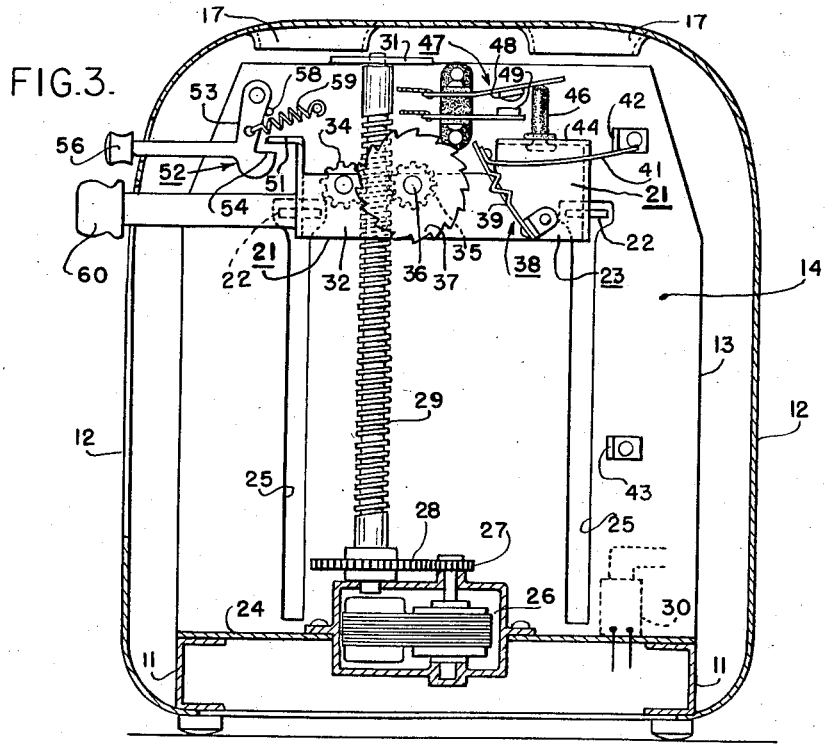
Fig. 3 is a front elevation of the mechanism shown in Fig. 1 in its uppermost position.

Referring to the drawings in detail and in particular to Fig. 1, there is shown a toaster incorporating the present invention. The toaster is of the oven type including a frame structure 11 and an enclosing shell 12 carried by the frame 11. The interior of the shell is divided by a vertical transverse partition 13 into an apparatus compartment 14 and an oven 16. The shell 12 is formed on its top side with a pair of openings 17 providing ingress and egress for the bread slices to be toasted.

The toasting apparatus within the oven 16 may be of any suitable construction and is not illustrated or described in detail for the sake of brevity and since it forms no part of this invention. Briefly, the oven 16 is provided with suitable heaters 18, spaced apart to define toasting wells indicated at 19 below the openings 17 of the shell 12. It is within the toasting wells 19 that the bread slices are lowered and elevated between non-toasting and toasting positions, all of which is well understood.

Within the apparatus compartment 14 is disposed a carriage 21 having horizontally extending bread bars 22 which support the bread in the toasting wells 19 and, also, a box structure 23. The partition 13 is provided with a horizontal flange 24, secured to the frame 11, and forming the base of the apparatus compartment 14. The bread bars 22 project through vertically extending slots 25 provided in the partition 13. Preferably, the slots 25 and the bars 22 are positioned and proportioned so that the slots 25 guide the bars 22, and hence the carriage 21, while the carriage is moving from one position to another, as hereinafter described.

Supported by the flange 24 is a motor 26 having a rotatable shaft and a pinion 27 secured thereto. The pinion 27 meshes with a gear 28 fixed to and driving a movable member or vertical worm gear 29 defining a helical cam surface. The motor 26 is controlled by a condition responsive device 30, referred to more in detail hereinafter and responsive to the surface temperature of the bread. The worm gear 29 is journalled at its upper end in a bearing provided in a projecting member or bearing support 31.

The box structure 23 is provided with a front wall 32 and a back wall 33. Positioned between and journalled in the front wall 32 and the back wall 33 and on either side of the worm gear 29 are worm wheels or pinions 34 and 35, one of which is disposed on the left-hand side of the worm gear 29 and the other on the right-hand side, and are, therefore, hereinafter referred to as the left-hand pinion 34 and right-hand pinion 35. The right-hand pinion 35 is provided with a shaft 36 which extends forwardly of the front wall 32 and carries a ratchet 37. The front wall 32 is provided with a clutch structure 38 comprising the ratchet 37 and a restraining member or resilient pawl 39. The pawl 39 is an over-center snap-acting device or spring secured at one end by a bracket 40 to the carriage 21. The free end of the pawl 39 is attached to a trigger arm 41, engageable with upper and lower stops 42 and 43, as described hereinafter. The carriage 21 travels between lower and upper stations, as hereinafter described, along the worm gear 29. The partition 13 carries the upper bar or stop 42 for disengaging the clutch 38 and for limiting upward travel of the carriage 21, as hereinafter described, and the lower bar or stop 43 for engaging the clutch 38 and limiting downward travel of the carriage.

Disposed above the uppermost position of the box 23 is a switch 47 having movable and stationary contacts 48 and 49, respectively. The box 23 is provided with a top wall 44 having a switch actuating finger 46 engageable with the movable contact 48. The switch 47 is biased toward its closed position and the finger 46 is positioned with respect thereto, so that the contacts 48 and 49 are separated, and the switch opened, when the box 23 approaches its upper position.

The left-hand portion of the box 23 is provided with a latch plate 51 extending to the left and engaging a latch structure 52. The latter includes a movable arm 53 having a suitable detent 54 engageable with the latch plate 51. The arm 53 extends through the shell 12, as shown, and carries a manually actuated handle 56. The arm 53 is pivoted about a pin 57 fixed to the partition 13, and movement of the arm 53 to the right is limited by a stop dowel 58. The arm 53 is biased to the right by a spring 59 secured to the partition 13.

The carriage 21 is provided with a handle 60 extending through a vertical slot 61 provided in the shell 11. The handle 60 is utilized to manually elevate the carriage for any reason, such as, to abort the toasting operation. When one exerts an upward force on the handle 60, the restraint of the pawl on the ratchet is overcome and the pinion 35 rotates counterclockwise.

Operation

Figure 2:
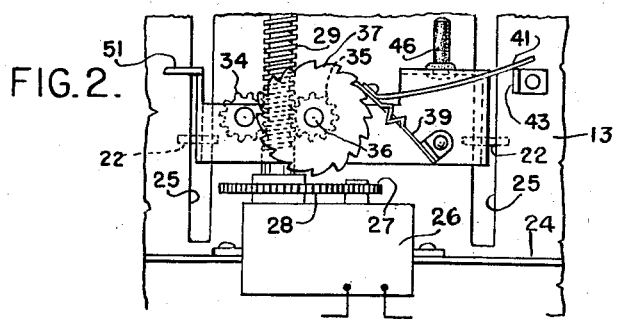
Fig. 2 is a front elevation of a portion of the mechanism illustrated in Fig. 1 when in its lower or toasting position.

The apparatus operates as follows: Referring to Fig. 1, the latch 52 maintains the carriage 12 in the bread receiving or non-toasting position. In initiating a toasting cycle, a slice of bread is inserted into the toaster, as is well understood. The latch 52 is manually released by the operator by lifting the handle 56 against the bias of the spring 59. Thus, the arm 53 is moved out of engagement with the plate 51, allowing the carriage to move downwardly due to its own weight and that of the bread. It will be noted that, in the latched position, the clutch 38 is disengaged, the ratchet 37 being unrestrained by the pawl 39. The right-hand pinion 35 is, therefore, free to turn clockwise and does so under the influence of the weight of the carriage and bread, and both descend when the latch 52 is released. The finger 46, which is fixed to the carriage, moves therewith and the switch 47 closes, energizing heating elements 18. The carriage descends until the lower bar 43 engages the trigger arm 41, rotating the pawl 39 over center and counterclockwise into engagement with the ratchet 37. The pinion 35 is prevented from continuing its clockwise rotation so that further downward movement of the carriage is terminated. The apparatus is now in the toasting position illustrated in Fig. 2.

The bread is now heated by the heaters 18 until the condition responsive device 30 signals that the bread has reached the desired color condition. At this time, a switch 62, forming a part of the device 30, is closed, and the motor 26 is energized for rotating the worm gear 29. Since the ratchet is secured against clockwise rotation by engagement with the pawl 39, the pinion 35 cannot rotate, and it acts as a threaded nut or member rigidly secured to the carriage and having threads or projections mating and engaging the worm gear 29. Accordingly, the carriage rises. As the carriage rises, the pinion 34 assures that the pinion 35 is properly meshed with the worm gear 29. It should be noted that the switch 62 of the device 30 that senses the condition of the bread being toasted is of the type that is biased open when relatively cool and is closed when heated to the temperature prevailing when the bread attains the desired condition. After the carriage is raised to its latched position wherein the switch 47 is opened and before the next toasting cycle begins, the device 30 cools sufficiently to open the switch 62 so that, the mechanism is ready for the subsequent toasting cycle.

When the carriage 12 has risen to a level just prior to the latched position, the contacts 48 and 49 are separated by the finger 46. The inertia of the carriage 21 and the motor 26 at this time is sufficient to lift the carriage 21 just above its latched position as illustrated in Fig. 3. The bar 42 and the arm 41 are positioned relative each other, so that, when the carriage is above the latched position, the arm 41 engages the bar 42 and causes the pawl 39 to snap to the right, moving out of restraining engagement with the ratchet 37. Thereafter, the carriage descends slightly by gravity until the plate 51 rests in the detent 54. The carriage has now attained the latched position illustrated in Fig. 1.

While the carriage is ascending automatically, the engagement of the pawl 39 with the ratchet prevents clockwise rotation of the pinion 35. However, any tendency toward counterclockwise rotation of the pinion 35 is resisted by the force of the pawl 39 bearing on the ratchet 37. The construction of the present invention is such that very little or no tendency will exist tending to rotate the pinion 35 counterclockwise. Should it be desired to overspeed the ascending movement of the carriage, an upward force may be manually exerted on the handle 60. This will overcome the restraint imposed by the clutch on the pinion 35, causing the latter to rotate counterclockwise.

Referring to Fig. 4, it is seen that the heaters 18 are connected in electrical parallel with the motor 26 under control of the switch 47. The motor 26 is also controlled by the device 30 (which includes the switch 62). In this manner, the switch 47 is closed for energizing the heating elements 18 immediately after the carriage is unlatched, as described but the motor 26 remains deenergized, the device 30 being relatively cool and the switch 62 being open at this time. During elevation of the carriage, initiated by the closing of the switch 62, the heating elements and the motor 26 are energized until just prior to the attainment of the latched position, at which time the switch 47 is opened by the finger 46, as described, the switch 62 remaining closed until after the switch 47 is opened by the finger 46. Thereafter, the switch 62 returns to its open position in response to cooling of the device 30 and is ready for the subsequent toasting operation, as described.

The invention has been described in conjunction with manually releasable latch structure 52. It is to be understood that suitable means may be provided for automatically releasing the latch responsive to the depositing of the bread upon the carriage.

Figure 5:
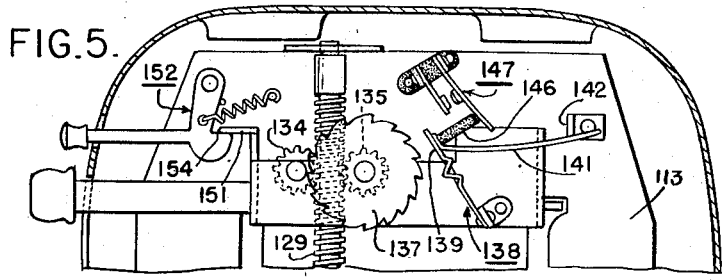
Fig. 5 is a partial front elevation of a modification of the mechanism illustrated in Fig. 1.

Referring to Fig. 5, there is illustrated an embodiment of the present invention provided with a modified clutch 138 and a differently positioned switch 147. The clutch 138 includes a ratchet 137, as in the previous embodiment, engageable with an actuator or modified pawl 139, having on its free end an upstanding finger 146. The finger 146 cooperates with a switch 147, similar to switch 47 of the previous embodiment, and carried by the partition 113.

In the present embodiment, the pawl 139 is positioned relative a stop bar 142 and a latch structure 152 so that the clutch 138 is disengaged and the switch 147 is opened just subsequent to the passage of the plate 151 above the detent 154. As soon as the detent 154 has been passed by the plate 151, the trigger arm 141 contacts the stop bar 142 and is rotated with the finger 146 clockwise. This clockwise movement first frees the restraint imposed by the pawl 139 upon the ratchet 137 and, thereafter the finger 146 opens the switch 147. It is apparent that by properly proportioning and placing the foregoing various elements, the disengagement of the clutch 138 and the opening of the switch 147 can be made almost contemporaneously. Opening the switch 147 deenergizes the motor and, since the ratchet 137 is now free, the carriage 121 descends until it is supported by means of the plate 151 resting in the detent 154 of the latch 152. In all other respects the device of the present embodiment is constructed and operates in a manner similar to that of the previous embodiment.

From the foregoing, it is apparent that an improved mechanism has been provided for moving the bread between toasting and non-toasting positions in a toaster of the class set forth. While the invention has been described in conjunction with a manually operated mechanism for starting the toasting cycle, it may be utilized in toasters provided with means for initiating the toasting cycle responsive to the insertion of the bread within the toaster.

While the invention has been shown in several forms, it will be obvious to those skilled in the art that it is not so limited, but is susceptible of various other changes and modifications without departing from the spirit thereof.

What is claimed is:

1. In an automatic bread toaster, the combination of a carriage for the material to be toasted and movable between a toasting and a non-toasting position, a rotatable worm gear for moving said carriage lengthwise of the worm, a pinion journalled in said carriage and meshing with the worm, means for rotating the worm, a clutch mechanism comprising a member movable with the carriage for restraining said pinion against rotation in one direction after said carriage is transported to adjacent one end of the worm, means for freeing the member from the pinion when the carriage arrives adjacent the other end of the worm, a latch structure engaging and supporting said carriage in its latter position and means for terminating rotation of the worm after said latch structure is engaged by said carriage.

2. In an automatic bread toasting apparatus the combination of, a carriage supporting the bread for movement between a toasting and a non-toasting position, means for moving said carriage comprising; a rotatable worm gear, means for rotating said worm gear, a pinion journalled in said carriage and meshing with said worm gear, a clutch secured to the carriage for restraining rotation of said pinion in one direction comprising, a ratchet rotatable with said pinion and a pawl carried by the carriage and engageable with said ratchet, means for engaging said clutch responsive to movement of said carriage to adjacent one end portion of said worm gear and for disengaging the clutch responsive to movement of the carriage to adjacent the other end portion of said worm gear, a latch structure for supporting said carriage in its latter position and means for deenergizing said rotating means responsive to the disengaging of said clutch.

3. In an automatic bread toasting mechanism the combination of; a carriage supporting the bread for movement between toasting and non-toasting positions; heaters for toasting the bread, a latch structure for supporting the carriage in the non-toasting position, means for moving the carriage to the toasting position and for returning the carriage to the non-toasting position comprising; a rotatable worm gear, means for rotating said worm gear, a pinion journalled in said carriage and meshing said worm gear, means for releasing the latch whereby the pinion rotates freely and the carriage gravitates to the toasting position, means for energizing the heaters responsive to the release of the latch; a clutch secured to the carriage for controlling direction of rotation of said pinion comprising; a ratchet rotatable with said pinion, a pawl engageable with said ratchet, means for engaging the clutch when said carriage is in the toasting position, means responsive to a condition of the bread for energizing the worm rotating means whereby the carriage moves along the worm gear to the non-toasting position and into engagement with the latch structure, means for deenergizing the heaters and said rotating means before the carriage engages the latch structure, and means for disengaging the clutch after the carriage engages the latch structure.

4. In an automatic bread toasting mechanism, the combination of a carriage supporting the bread for movement between lower, toasting and upper, non-toasting positions; heaters for toasting the bread, a latch structure for supporting the carriage in the upper, non-toasting position, means for moving the carriage to the lower, toasting position and for returning it to the upper, non-toasting position comprising; a vertically extending rotatable worm gear, a motor for rotating said worm gear, a pinion journalled in said carriage and meshing with said worm gear, means for releasing the latch whereby the pinion rotates freely and the carriage gravitates from the upper, non-toasting position to the lower, toasting position, a switch for energizing the heaters responsive to the lowering of the carriage to the toasting position; a clutch secured to the carriage allowing said pinion to rotate in one direction and restraining said pinion from rotating in the opposite direction comprising; a ratchet secured coaxially with said pinion and rotatable therewith, a pawl engageable with said ratchet, means for engaging the clutch when said carriage is in the toasting position comprising a trigger arm secured to said pawl, a bar engageable with said trigger arm causing said pawl to engage said ratchet and thereby limit further downward movement of the carriage, means responsive to a condition of the bread for energizing the worm motor whereby the carriage is moved upward along the worm gear to the upper, non-toasting position and into engagement with the latch structure, means for deenergizing the heaters and the motor before the carriage arrives at the non-toasting position comprising a finger for opening said switch before the carriage engages the latch structure and means for disengaging the clutch subsequent to the carriage engaging the latch structure including a second bar for actuating said trigger arm whereby said pawl is disengaged from the ratchet.

5. In automatic bread toasting apparatus the combination of, a carriage supporting the bread for movement between a toasting and a non-toasting position, a latch structure for supporting said carriage in the non-toasting position, means for moving said carriage comprising; a rotatable worm gear, means for rotating said worm gear, a pinion journalled in said carriage and meshing with said worm gear, a clutch secured to the carriage for restraining rotation of said pinion in one direction comprising, a ratchet rotatable with said pinion and a pawl engageable with said ratchet, means for engaging said clutch responsive to movement of said carriage to adjacent one end portion of said worm gear, and an actuator for disengaging the clutch responsive to movement of the carriage to adjacent the other end portion of said worm gear and for deenergizing said rotating means after said carriage engages said latch structure.

6. In an automatic bread toasting mechanism the combination of; a carriage supporting the bread for movement between lower toasting and upper non-toasting positions; heaters for toasting the bread, a latch structure for supporting the carriage in the non-toasting position, means for moving the carriage to the toasting position and for returning the carriage to the non-toasting position comprising; a rotatable worm gear, means for rotating said worm gear, a pinion journalled in said carriage and meshing said worm gear, means for releasing the latch whereby the pinion rotates freely and the carriage gravitates to the lower toasting position, means for energizing the heaters responsive to the release of the latch; a clutch secured to the carriage for controlling the direction of rotation of said pinion comprising; a ratchet rotatable with said pinion, a pawl engageable with said ratchet, means for engaging the clutch when said carriage is in the toasting position, means responsive to a condition of the bread for starting rotation of said worm gear whereby the carriage moves along the worm gear to the upper non-toasting position and into engagement with the latch structure, an actuator for disengaging the clutch subsequent to engagement of the carriage and latching structure, and means for deenergizing the heaters and the rotating means in the upper non-toasting position of the carriage.

7. In an automatic bread toasting mechanism, the combination of a carriage supporting the bread for movement between lower toasting and upper non-toasting positions; heaters for toasting the bread, a latch structure for supporting the carriage in the upper, non-toasting position, means for moving the carriage to the lower, toasting position and for returning it to the upper, non-toasting position comprising; a vertically extending rotatable worm gear, a motor for rotating said worm gear, a pinion journalled in said carriage and meshing with said worm gear, means for releasing the latch whereby the pinion rotates freely and the carriage gravitates from its upper, non-toasting position to its lower toasting position, a switch for energizing the heaters responsive to the lowering of the carriage to the toasting position; a clutch secured to the carriage allowing said pinion to rotate in one direction and restraining said pinion from rotating in the opposite direction comprising; a ratchet secured coaxially with said pinion and rotatable therewith, a pawl engageable with said ratchet, means for engaging the clutch when said carriage is in the toasting position comprising a trigger arm secured to said pawl, a bar engageable with said trigger arm causing said pawl to engage said ratchet and thereby limit further downward movement of the carriage, means responsive to a condition of the bread for energizing the worm motor whereby the carriage is moved upward along the worm gear to its upper, non-toasting position and into engagement with the latch structure, means for deenergizing the heaters and the motor subsequent to engagement of the latch by the carriage, a finger for opening said switch, and means for disengaging the clutch subsequent to the carriage engaging the latch structure comprising a second bar for actuating said trigger arm and finger whereby said pawl is disengaged from the ratchet and said switch is opened.

References Cited in the file of this patent
UNITED STATES PATENTS

| | | |
|---|---|---|
| 258,121 | Richards | May 16, 1882 |
| 856,272 | Lippert | June 11, 1907 |
| 2,565,020 | Christman | Aug. 21, 1951 |
| 2,687,078 | Ihrke | Aug. 24, 1954 |